United States Patent Office 2,895,798
Patented July 21, 1959

2,895,798
BARIUM RECOVERY PROCESS

Raymond E. Blanco, Oak Ridge, Tenn., assignor to the United States of America as represented by the United States Atomic Energy Commission No Drawing. Application October 26, 1954
Serial No. 464,918

6 Claims. (Cl. 23—102)

My invention relates to an improved process for the separation of barium from associated impurities and more particularly to the separation of barium activity from the products of nuclear fission.

Barium, including both the isotopes of mass 138 and mass 140, is one of the many products of nuclear fission. Barium 140 is radioactive and decays according to the following scheme:

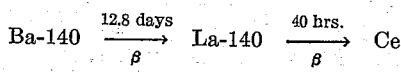

$$\text{Ba-140} \xrightarrow[\beta]{12.8 \text{ days}} \text{La-140} \xrightarrow[\beta]{40 \text{ hrs.}} \text{Ce}$$

Barium and its daughter lanthanum are of considerable academic and practical importance. For example, barium-140 is widely employed as a tracer, particularly in the oil industry. Lanthanum-140 is a strong gamma emitter and among other uses, is employed in biological studies into the effects of gamma emissions on animal tissue.

The recovery of barium from a neutron-irradiated fissionable material is extremely difficult since barium is produced only in trace amounts and must be separated from a multiplicity of other fission products as well as from gross amounts of unfissioned material. (Reactor fuels are commonly withdrawn for decontamination long before total consumption, due to the accumulation of fission product poisons, which if unremoved, may damp the chain-reaction.) For instance, depending upon irradiation conditions and time spent in chemical processing, as much as 20 million grams of normal uranium might be processed to obtain only 1 gram of barium. Furthermore, in view of the short half life of barium-140, extremely large amounts of barium activity, frequently multi-kilocurie batches, must be produced to provide workers with a supply of reasonable life.

An object of my present invention, therefore, is to provide an improved method for the separation and recovery of barium from extraneous impurities.

Another object is to provide a method for the separation and recovery of barium from the products of nuclear fission.

Another object is to provide a relatively rapid method, amenable to large scale, remote-control operation, for the separation and recovery of barium in excellent yield and high purity from neutron irradiated uranium and its associated fission products.

These and additional objects and advantages of my invention will become apparent to those skilled in the art from the following description and the claims appended hereto.

In accordance with my invention, barium may be separated from an aqueous mineral acid solution of a neutron-irradiated fissionable material by substantially selectively precipitating barium from said solution, separating the resulting barium precipitate from the resulting supernatant solution, dissolving the separated precipitate, contacting the resulting solution with a comminuted cation exchange resin, and selectively eluting and collecting the resulting adsorbed barium from said resin.

Barium may be recovered, in accordance with my invention, from any neutron-irradiated fissionable material, including uranium-233, uranium-235 and plutonium. However, as is well known, presently operating reactors employ uranium-235, together with varying concentrations of uranium-238, almost exclusively as the fissionable fuel. Furthermore, uranium and plutonium are soluble, at least to some extent, in a number of aqueous mineral acids, such as, for example, aqueous hydrochloric, sulfuric and hydrofluoric acids, and barium may be satisfactorily precipitated and separately recovered from such solutions as the chloride, sulfate or fluoride. Nonetheless, aqueous nitric acid is a most effective and commonly used reagent for dissolving uranium and plutonium. Therefore, for clarity in presentation, and importance of disclosure to the art, my invention will be illustrated specifically with regard to the recovery of barium from an aqueous nitric acid solution of uranium contaminated with the products of nuclear fission.

Barium may be substantially preferentially precipitated from a uranyl nitrate solution as the carbonate. Although soluble over a wide pH range, barium carbonate may be precipitated at pH 7.8, while the uranium is held in solution as a soluble carbonate complex. Barium may also be precipitated as the sulfate, and the precipitate collected by high speed centrifugation. It may be seen, however, that it is difficult to provide a completely satisfactory direct barium precipitation method, due to solubility product requirements and collection of tiny amounts of precipitate. I find, therefore, that carrier precipitation of the barium is appreciably more suitable, and that co-precipitation with carrier lead as the sulfate is highly effective.

Although the carrying of barium from the uranyl nitrate solution with lead sulfate may be effected in different manners, I prefer to add lead to the solution as a soluble lead salt, such as the nitrate, and then sulfuric acid to the resulting solution, digest same, and recover the lead-barium sulfate precipitate by such conventional means as filtration, centrifugation or decantation. For substantially complete removal of barium from solution, as much as a fifty-fold excess of lead may be required. Although variations in reagant concentrations and in procedures may be satisfactorily permitted, I prefer to add approximately 1 gram lead nitrate/liter to an aqueous, approximately 40%–50%, by weight, uranyl nitrate solution, followed by approximately 18 molar sulfuric acid to the resulting solution until same is approximately 2 molar in sulfuric acid, and then approximately 6 molar sulfuric acid until a final sulfuric acid concentration af approximately 3.6 molar is obtained. The resulting solution may then be digested at approximately 90° C. for approximately one hour, the barium-lead sulfate precipitate separated from the supernatant solution, and the separated precipitate washed.

The co-precipitation of barium from the uranyl nitrate solution with added carrier lead as the sulfate serves to separate the barium from the uranium and the majority of fission products. This accomplishes considerable decontamination of barium, permits the following steps to be conducted with relatively less shielding and generally contributes to the obtainment of a product of much higher purity than could be obtained if the uranium-barium separation were attempted directly by ion exchange means. Furthermore, and most uncommon in radiochemical carrier methods for recovery of fission products, carrier barium need not be added, in addition to the lead, for complete barium removal from solution. This, most desirably, prevents the dilution of the radio-activity of the product with non-radioactive barium, and is very important where a concentrated, point-source of barium activity is required. Another particularly important benefit of the barium-uranium separation is the protection of the ion exchange resin from severe radiation damage. A high radiation level may induce such deleterious effects in a resin bed as vapor blocks, due to gas release, frequently from water decomposition; severance of active exchange groups from the resin, decreasing resin capacity, decreasing separation efficiency and, where sulfonic acid-base resins are being employed, risking disastrous precipitation of product barium sulfate in the resin bed; and decomposition of process reagents, with damaging pH changes.

The barium-lead sulfate precipitate contains, as contaminants, principally strontium which, as a fellow alkaline earth metal, is very chemically similar to barium, together with traces of iron, chromium, nickel, rare earths, and other fission products. This difficultly-soluble precipitate may be satisfactorily dissolved, in accordance with my invention, principally by three different methods, and these methods will now be briefly indicated before proceeding to a detailed discussion of each. In the first method, the barium-lead sulfate precipitate may be dissolved in an aqueous solution of an aliphatic diamine chelating reagent, and the resulting solution then contacted with the comminuted resin. In the second method, the barium-lead sulfate precipitate may be metathesized to a relatively more acid-soluble salt, and the resulting salt dissolved in an aqueous solution of nitric acid and the diamine chelating reagent. In the third method, the lead-barium sulfate precipitate may also be metathesized to a relatively more soluble salt, the resulting salt dissolved in an aqueous solution of nitric acid and carboxylate ion, any remaining unmetathesized carboxylate-insoluble sulfate separately dissolved in an aqueous solution of the diamine chelating reagent, and the resulting solutions then separately contacted with the comminuted resin.

Returning now to the first dissolution method, I find that chelating reagents, particularly aliphatic diamines of general structural representation $NH_2(CH_2)_{2-5}NH_2$ are unexpectedly well suited for this difficult dissolution. Within this group, ethylene diamine tetraacetic acid (EDTA) is preferred. Although the concentration of the diamine solution may vary satisactorily, relatively dilute solutions are most suitable, and a 0.1 molar solution is preferred. (EDTA is a solid, water-insoluble acid which may be dissolved in a weakly alkaline solution, or converted to an alkali salt prior to dissolution in water.) The complexing action of EDTA is very pH-dependent, and extremely delicate care must be exercised in its employment. Thus, at high pH's metal-EDTA complexes are strong, decreasing with lower pH's until there is little complexing action below pH 4.0 and precipitation as the acid may occur. For example the distribution coefficient $$\left(\text{i.e., } \frac{\text{counts/minute/gram/solution}}{\text{counts/minute/gram/resin}}\right)$$

of barium and strontium in a EDTA-resin system decreases by a factor of 100 as the acidity increases from pH 7.0 to pH 5.0. At approximately pH 6.0–6.5, I find that barium is unpredictably the most weakly complexed cation of those of interest in this system, and, therefore, will preferentially adsorb onto the resin. Therefore, the utilization of approximately pH 6.0–6.5 is critical, while approximately pH 6.3 is preferred. If other pH's are employed, the barium will not adsorb onto the resin to the same extent, and appreciable losses will result. The following elements of interest in this system are listed in order of decreasing complex strength with EDTA at pH 6.3: rare earths, lead, nickel, chromium, iron, calcium, strontium and barium. It is noted that the lead, added to the uranyl nitrate solution to carry the barium sulfate precipitate, forms a very strong EDTA complex, readily dissolving over a wide pH range before any complexing of barium or strontium, and thus an excellent separation of barium and lead is achieved.

While this method of dissolving the barium-lead sulfate precipitate permits an excellent recovery of barium, certain minor operational disadvantages nonetheless attend its use, particularly where relatively large scale batches of barium activity (e.g., greater than 4,000 curies) are being processed. For example, a relatively high concentration of EDTA is required for the dissolution of the difficultly-soluble barium-lead sulfate precipitate. Thus, the amount of EDTA required to dissolve the lead-barium sulfate precipitate increases almost linearly with the relatively small barium and strontium concentration in a mixture with a given large concentration of lead sulfate carrier (approximately 2 millimoles of EDTA being needed to dissolve 1 milligram of barium and strontium). Since the amount of resin needed to adsorb barium from an EDTA solution increases directly with an increase in solution volume (frequently to obtain 0.5–2 grams of product, as much as 100 gallons of solution must be processed), large amounts of process equipment and radiation shielding equipment would be required for operation on such a scale.

I find that these disadvantages may be overcome by first metathesizing the sulfate cake to a relatively more aqueous acid-soluble form prior to dissolution. In one such method, the precipitate may be treated with an alkali carboxylate, such as ammonium acetate, and the resulting lead-barium acetate dissolved in dilute nitric acid. Particularly advantageous, though, is a metathesis to the carbonate. The carbonate methathesis may be variously performed, and a particular method is not critical to the success of my invention. However, I prefer to add a 4 molar alkali carbonate solution, such as potassium carbonate, to the lead-barium sulfate precipitate obtained as described above, digest the mixture for approximately 15 minutes at 90° C., dilute the resulting solution to approximately 0.5 molar in carbonate and continue the digestion for one hour. At the end of this time, the precipitate may be separated, washed with water, and the above sequence repeated. The resulting carbonate precipitate may then be dissolved in a relatively dilute solution of an aqueous mineral acid, such as, for example, approximately 0.4 molar nitric acid, which destroys the carbonate ion. Although all the treated precipitate may initially dissolve in the nitric acid, any slight amount of unmethathesized sulfate may later precipitate out of solution and greatly interfere with process operation, particularly in the ion exchange separations. This occurrence may be understood when it is remembered that the ratio of lead carrier to barium in the co-precipitation from the uranyl nitrate solution may be as high as fifty to one, in order to obtain complete recovery of barium. Thus, it is possible to metathesize 99% of the total lead-barium sulfate precipitate and still have sufficient sulfate anion remaining to precipitate all the barium. For example, a 99.9% metathesis of the lead-barium sulfate is required to obtain a 94% conversion of barium to an acid soluble form, for with as high as a 99.5% metathesis only 80%–88% of the barium is acid soluble. In view of this, a small amount of EDTA may be added to complex any remaining unmetathesized barium and lead sulfate. Thus, adjusting the nitric acid solution of the metathesis precipitate to at least approximately 0.05 molar in EDTA is satisfactory, while approximately 0.1 molar in EDTA is preferred.

This dissolution method is highly satisfactory, permits subsequent barium recoveries up to approximately 99%, and is preferred at most radiation levels. However, at extremely high radiation levels, where multi-kilocurie quantities (e.g. >15,000 curies) of barium are being processed, EDTA has a tendency to decompose, resulting in a rise in pH and subsequent precipitation of barium, strontium and cerium. Thus, for large scale operations, it would be desirable to employ EDTA in such a manner that it will receive a minimum of radiation. This may be achieved in my third dissolution method by metathesizing the barium-lead sulfate precipitate to an acid soluble form, for instance the carbonate, as in the foregoing, dissolving the resulting relatively more soluble precipitate in a solution of a dilute aqueous nitric acid and carboxylate ion. Particularly suitable carboxylic acids for this purpose are those which have a small tendency to complex barium, such as propionic, while acetic acid is preferred. Sodium acetate is the preferred salt form and, although not critical, its concentration may satisfactorily vary from approximately 0.25 molar to approximately 2 molar, approximately 0.5 molar being preferred. In addition to being more radiation-stable than EDTA solutions, such carboxylate solutions have the further advantage that their complexing action is not pH-dependent, and in fact do not complex barium to any appreciable degree, and careful pH adjustments need not be made to insure the adsorption of barium onto the ion exchange resin. The nitric acid-carboxylate solutions will dissolve metathesized barium and lead but will not dissolve any appreciable amounts of unmetathesized sulfate. Any remaining sulfate may then be separately dissolved with dilute EDTA (0.05–0.1 molar), the resulting solution adjusted to pH 6.0–6.5, and then separately contacted with the same resin bed as the carboxylate solution. Thus, in this dissolution method, the use of EDTA is confined to the dissolution of unmetathesized barium and lead sulfate in contrast to its more general use in the preceding methods.

In addition to my three principal dissolution methods, the lead-barium sulfate precipitate may be dissolved in an aqueous basic solution. For example, the precipitate may be dissolved in an alkali hydroxide, such as approximately 6 molar sodium hydroxide, and then diluted to approximately 0.5 molar sodium hydroxide. Great care must be exercised to remove all carbonate from the system, and this dissolution method is consequently not as highly recommended as the above methods.

After dissolution of the barium-lead sulfate precipitate, the resulting solution may then be contacted with a comminuted organic cation exchange resin. Although a wide variety of resins may be employed, I find that particularly satisfactory results may be obtained with a relatively inert organic cation exchange resin containing free sulfonic acid groups, that is, resins which contain numerous R—$SO_3$—R' groups, in which R is an organic group such as a methylene group and in which R' is sodium or a transition element such as nickel, copper or cobalt which form extremely strong complexes with EDTA. The acid form of the resin is definitely undesirable since it may form the insoluble acid with the EDTA anion upon exchange of cations. Particularly suitable resins which may be employed are sulfonated phenolic resins, while sulfonated polystyrene resins are preferred due to their large exchange capacity resistance to physical breakdown under nuclear irradiation and chemical stability to eluting agents. Both these resin types contain a plurality of methylene sulfonic acid groups (—$CH_2SO_3H$), and in the adsorption process, the cation of the sulfonic acid group is replaced by a cation of the substance to be adsorbed, which thereupon forms a more or less loosely associated molecule with the resin. Representative sulfonated phenolic resins are the Dow Chemical Company resin sold under the trade name of Dowex-30, Rohm and Haas IR-100, and Ionics, Inc. CR-51, while an excellent representative sulfonated polystyrene resin, which I prefer to employ, is the Dow Chemical Company resin Dowex-50. For a detailed description of Dowex 30, reference is made to Industrial and Engineering Chemistry 38, 46 (1946), together with U.S. Patent 2,204,539 to Wassenegger and Jaeger, and for a detailed description of Dowex 50 reference is made to the Journal of the American Chemical Society 69, 2830 (1947) together with U.S. Patent 2,366,007 to D'Alelio.

The above resins may be satisfactorily employed in a wide variety of particle sizes. The use of smaller resin particles results in more rapid attainment of equilibrium during adsorption and of sharper bands during elution, thereby permitting faster flow rates. However, extremely small resin particles produce a high resistance to the flow of liquid in the column and a compromise must be made between resin size and hydrostatic head needed to maintain an efficient but economic flow rate. A satisfactory compromise between hydraulic and diffusion efficiencies may be attained with the employment of a resin of mesh size of approximately 40–200, while approximately 60–100 mesh is preferred.

When the comminuted resin is employed in columnar arrangement, the particular flow rates for the passage of the feed and elutriant solutions through the column are not highly critical. Nonetheless, it is desirable to employ as fast a flow rate as is consistent with the attainment of a clean separation between the metal cations, for this desirably decreases resin and process reagent irradiation time. Thus, I find that a flow rate of approximately 4–12 ml./cm.$^2$/min. achieves a rapid but yet discrete separation of the barium from other adsorbed elements, while approximately 10 ml./cm.$^2$/min. is preferred.

The only impurities adsorbed onto the resin together with barium to any appreciable extent, regardless of the dissolution method employed, are lead, strontium and to lesser extents, chromium, iron, rare earths and other fission products. In the metathesis-carboxylate dissolution method, the lead is readily dissolved and adsorbs onto the column together with barium and strontium, since the lead is not complexed to the same extent by the carboxylate as it is with EDTA. It is desirable to elute the lead prior to the passage of the EDTA solution of any unmetathesized sulfate over the resin, or the elution of other adsorbed cations. This may be satisfactorily effected with a relatively dilute, aqueous alkali metal hydroxide, such as, for example, 0.5 molar sodium hydroxide, thereby removing the lead as the plumbite anion complex, after which the EDTA solution of any unmetathesized sulfate may be contacted with the resin bed.

After the lead elution, the remaining strontium may be selectively removed from the resin column with an aqueous solution of relatively dilute EDTA, for strontium-EDTA complexes are much stronger than the barium-EDTA complexes, especially in the preferred pH range. Thus, the strontium may be efficiently removed from the resin, with negligible product loss, with an approximately 0.05–0.2 molar solution of EDTA at approximately pH 6.0–6.5, while a solution approximately 0.07 molar in the sodium form of EDTA at approximately pH 6.3 is preferred. After removal of the strontium from the resin bed, only barium and sodium (when this preferred resin form is being employed) remain thereon, and the sodium may be eluted with a relatively dilute, aqueous mineral acid such as, for example, nitric or hydrochloric acids. This separation may be relatively easily effected with minimum barium loss, since the divalent barium ion is adsorbed on the column much more stronger than the monovalent sodium ion. While a wide acid concentration range may be satisfactorily tolerated, I find that approximately 0.5–2.0 molar hydrochloric acid is particularly satisfactory for this elution, while approximately 1.0 molar hydrochloric acid is preferred.

After any removal of sodium, the barium product may then be eluted with a relatively stronger aqueous mineral acid than is employed for the sodium elution. For example, I find that approximately 6–12 molar nitric acid is highly suitable, while approximately 9 molar nitric acid is preferred. The barium may be concentrated from the product eluate by various methods. The solution may be evaporated to dryness, or the barium precipitated from aqua regia or approximately 30% hydrogen peroxide. I find, however, that precipitation from concentrated nitric acid is particularly effective in concentrating and even further purifying the barium a concentration of 85% $HNO_3$ is preferred. Any traces of discoloring, resin decomposition products, sulfate and fission product impurities and conversion impurities such as Fe, Cr, and Ni are also thereby removed from the product.

In a preferred form of my invention, particularly at extremely high radiation levels, barium may be recovered from a uranyl nitrate solution of neutron-irradiated uranium by adding approximately 1 gram lead nitrate/ml. to said solution, followed by sulfuric acid until a sulfuric acid concentration of approximately 3.6 molar is obtained. The resulting solution is then digested and the resulting precipitate separated from the supernatant solution. The separated barium-lead sulfate precipitate may then be digested with potassium carbonate to yield barium-lead carbonate. The carbonate is dissolved in a solution 0.4 molar in nitric acid and 0.5 molar in sodium acetate and the resulting solution passed through a column of a sodium form, 40–200 mesh organic cation exchange resin characterized by a plurality of methylene sulfonic acid groups at a flow rate of 4–12 ml./cm.$^2$/min. The adsorbed lead is selectively removed from the column with 1.5 molar sodium hydroxide. Any metathesis cake undissolved by the sodium acetate is dissolved in dilute (0.05–0.1 molar) EDTA at PH 6.3 and the resulting solution passed through the lead-depleted column at a flow rate of 4–12 ml./cm.$^2$/min. Any remaining strontium may be selectively removed from the column with a dilute 0.07 molar solution of EDTA at pH 6.3, sodium with 1 molar hydrochloric acid and the barium product with 9 molar nitric acid, all at a flow rate of approximately 5–12 ml./cm.$^2$/min. The barium product 3.2 mg. $Sr^{+2}$, 22.0 mg. $Fe^{+3}$, 5.7 mg. $Ni^{+2}$ and 8.3 mg. $Cr^{+3}$ was dissolved in 200 ml. of 0.1 M EDTA at pH 10 and the pH of the resulting solution adjusted to 6.3. The solution was passed through a 0.67 inch diameter x 20 inch height resin column at a flow rate of approximately 1.2 ml./cm.$^2$/min. The resin was 100–200 mesh Dowex-50 (Nalcite HCR) which was converted to the $Na^+$ form with concentrated $NaNO_3$, buffered with 0.1 M EDTA at pH 5.4, and washed with water prior to the introduction of the feed solution. The Ba was quantitatively adsorbed onto the resin, together with Sr and trace amounts of other impurities, while the bulk of the Fe, Pb, Cr and rare earths passed through as their respective EDTA complexes along with anion sulfate.

The impure Ba product was removed from this column, which in effect had acted as a metathesis substitute column by separating Ba from sulfate, in a small volume of 0.25 M EDTA at pH 11. This removal was efficient and quantitative due to the strong EDTA complexes formed at high pH values. The eluate was adjusted to pH 4.3 and to a volume of 300 ml. and then passed through a second, smaller purification column of the above resin, whose dimensions were 0.67 inch diameter x 7 inch height, at a flow rate of approximately 1.2 ml./cm.$^2$/min. At this feed solution pH, the complexing action of EDTA is very small and the cations were effectively quantitatively adsorbed at the top of the column, leaving the rest of the column free for chromatographic separation procedures.

The column was washed with water to displace any remaining feed solution. Approximately 250 ml. of 0.07 M EDTA, pH 6.3, was then passed through the column, and Sr, along with any traces of Fe, Pb, Cr or Ni left in the system, was eluted. At this point, only Ba and Na remained on the column and the Na was eluted with 250 ml. of 0.5 M HCl. The Ba product was then eluted with 200 ml. of 6N $HNO_3$.

In Table I below, is shown various data from each of the examples.

Table I
RESULTS EMPLOYING EDTA DISSOLUTION OF Ba—$PbSO_4$

| Example | Metathesis Substitute Column | | | | | Purification Column | | | | | | | Ba Material Balance, percent |
|---|---|---|---|---|---|---|---|---|---|---|---|---|---|
| | Waste Analysis | | | | Impure Ba Product (percent) | Waste Analysis | | | | Product Analysis | | | |
| | Ba (percent) | Sr (percent) | Fe (percent) | Pb (percent) | | Ba (percent) | Ba (percent) | Sr (percent) | Ba (percent) | Ba (percent) | Sr (percent) | Pb (percent) | |
| 1 | 0.73 | 79.3 | 65.6 | 136 | 105 | 0.6 | 0.78 | 17.9 | 1.8 | 96.1 | 0.76 | <0.02 | 100.01 |
| 2 | <1.1 | 76.3 | 72.6 | 147 | 108 | <0.32 | <1.12 | 18.44 | <1.79 | 101.1 | <0.29 | <0.04 | <105.4 |
| 3 | 2.5 | 85 | 63 | 154 | 110 | 0.1 | 0.2 | 6.0 | 0.7 | 97 | 0.3 | <0.06 | 100.5 | may then be further purified by precipitation from concentrated (85%) nitric acid.

The following Examples are offered to illustrate my invention in greater detail.

EXAMPLES 1–3

These examples are particularly intended to show the dissolution of unmetathesized Pb—$BaSO_4$ with aqueous EDTA.

Approximately 1 gram $Pb(NO_3)_2$ per milliliter was added to a 50% uranyl nitrate hexahydrate solution, by weight, of neutron-irradiated uranium, which was formed by nitric acid dissolution of the uranium, followed by 18 M $H_2SO_4$ until the solution was 2 M in $H_2SO_4$ and then 6 M $H_2SO_4$ to give a final $H_2SO_4$ concentration of 3.6 M. The resulting solution was digested at 90° C. for one hour, after which the Ba—$PbSO_4$ precipitate was permitted to settle, the supernatant solution decanted and the precipitate washed with water. The precipitate, containing 2236 mg. $Pb^{+2}$, 29.7 mg. $Ba^{+2}$,

EXAMPLES 4–5

Same as Examples 1–3, except that the nickel form of the resin was employed instead of the sodium form. The nickel form was prepared by passing three cycles of concentrated $NaNO_3$, followed by 6 N $HNO_3$ through the resin column, initially in the $H^+$ form. The resin was then washed with water and a pH 2.3, 0.25 M nickel citrate solution passed through the column until the effluent reached an acidity of approximately pH 2.3.

The principal advantage of employing the nickel form for other transition series metals of the resin, rather than the sodium or hydrogen form, was that only a single resin column with corresponding less shielding had to be employed to obtain a pure product rather than two as in the previous examples. It is hypothecated that this form of the resin also provides more exchange points than the sodium form. As the nickel-EDTA complex is much stronger than the EDTA complexes of barium and strontium, the nickel is desorbed during passage of the feed solution over the resin bed, leaving Ba and Sr to adsorb onto the column. Thus, the net result of this operation is the use of the upper portion of the column to replace the metathesis step, and the lower portion of the column for the chromatographic purification of barium.

The results of employing this resin form are tabulated below in Table II.

EXAMPLE 9

Same as Examples 6–8 except as indicated. This example is designed to particularly show an actual large scale production run employing the carbonate metathesis, $HNO_3$—EDTA dissolution method.

The Ba—$PbCO_3$ metathesis cake was dissolved in eight liters of 0.4 M $HNO_3$. The composition of this solution is shown below.

*Table II*
PURIFICATION OF BARIUM EMPLOYING NICKEL FORM OF RESIN

| Example | Waste Analysis | | | Product Analysis | | | | | | Barium Material Balance, percent |
|---|---|---|---|---|---|---|---|---|---|---|
| | Feed Effluent (percent Ba) | Contaminant Eluate (percent Ba) | Sodium Eluate (percent Ba) | Ba (percent) | Sr (percent) | Ni (mg.) | Cr (mg.) | Fe (mg.) | Pb (mg.) | |
| 4 | 0.008 | 0.22 | 1.00 | 101.6 | 0.78 | 0.25 | 1.24 | 6.2 | 8.68 | 102.9 |
| 5 | 0.00 | 9.4 | 14.9 | 75.7 | 1.45 | 0.41 | 0.10 | 0.10 | 0.73 | 100.0 |

EXAMPLES 6–8

Same as Examples 1–3, except as indicated. These examples are particularly intended to show the metathesis of the Ba—$PbSO_4$ precipitate prior to dissolution in $HNO_3$ and EDTA.

The Ba—$PbSO_4$ precipitate, containing 100 mg. $Ba^{+2}$, 100 mg. $Sr^{+2}$, 44.0 mg. $Fe^{+3}$, 16.6 mg. $Cr^{+3}$ and 11.4 mg. Ni, 4.35 grams $Pb^{+2}$ (Example 7, 5.22 grams Pb and Example 8, 3.48 grams Pb) was digested with 4 M $K_2CO_3$ at 90° C. for fifteen minutes, after which the solution was diluted to 0.5 M $K_2CO_3$ over a period of one half hour and the digestion continued for another half-hour.

The supernatant solution was decanted and the precipitate retreated in the above manner. The resulting carbonate precipitate was dissolved in 600 ml. of a pH 6.4, 0.4 M $HNO_3$ and 0.05 molar EDTA solution. The solution contained approximately 5 mg. $SO_4^=$, which represented a 99.5% metathesis.

The resin was 60–100 mesh Dowex-50, initially in the acid form, and was converted to the sodium form with three cycles of 6 M $HNO_3$, followed by concentrated $NaNO_3$, 150 vol. each; buffered with 0.1 M EDTA at pH 6.4 until the effluent was also pH 6.4; and finally washed with 200 ml. water.

The strontium was eluted with 0.7 M EDTA at pH 6.3, the sodium with 1.0 M HCl, and the barium product with 6 N $HNO_3$. The results of each example are shown in Table III below.

*Table IV*
COMPOSITION OF NITRIC ACID SOLUTION OF Ba—$PbCO_3$

| Component | Amount |
|---|---|
| Barium | 1.2 grams/10,000 curies. |
| Strontium | 1.4 grams/10,000 curies. |
| Iron | 1.0 gram/10,000 curies. |
| Nickel | 300 milligrams/10,000 curies. |
| Chromium | 200 milligrams/10,000 curies. |
| Lead | 87 grams/10,000 curies. |
| Sulfate | 0.2 to 0.4 gram/10,000 curies (equals about 99% metathesis). |
| Sodium | |

Two liter of 0.5 M sodium EDTA were added to the nitric acid solution, and the acidity of the resulting solution adjusted to approximately pH 6.2–6.5 with $HNO_3$. The final volume was brought up to 12 liters with water and the resulting feed solution passed through a 25 inch height x 0.67 inch diameter resin column of 60–100 mesh Dowex-50, initially in the $Na^+$ form, at the rate of 10ml./cm.²/min. The bulk of the contaminants in the feed solution were not adsorbed on the column and passed through in the waste effluent. Approximately 10% of the Sr, however, was caught on the bottom of the column along with small amounts of other impurities, and these impurities were selectively eluted with 0.07 M EDTA at pH 6.3.

At this point in the process, only Ba and Na remained on the column, and the sodium was selectively eluted

*Table III*
RESULTS EMPLOYING METATHESIS AND $HNO_3$-VERSENE DISSOLUTION OF Ba—PbCO

| Example | Waste Analyses | | | Product Analyses | | | | | | Ba Material Balance, Percent |
|---|---|---|---|---|---|---|---|---|---|---|
| | Feed Effluent (percent Ba) | Strontium Eluate (percent Ba) | Sodium Eluate (percent Ba) | Ba (percent) | Sr (percent) | Fe (mg.) | Ni (mg.) | Cr (mg.) | Pb (mg.) | |
| 6 | 0.034 | 0.00 | 0.086 | 101.79 | 0.64 | 0.14 | 0.14 | 0.14 | 0.99 | 101.91 |
| 7 | 0.09 | 0.03 | 0.00 | 94.19 | 0.48 | 0.5 | 0.1 | 0.1 | 0.7 | 94.30 |
| 8 | 0.02 | 0.04 | 0.04 | 92.87 | 1.29 | 0.33 | 0.12 | 0.12 | 0.84 | 92.97 | with 1 M HCl. The pure Ba product was eluted with 6 M HNO₃ and concentrated by precipitation as the nitrate from fuming 85% HNO₃ followed by filtration. The final Ba yield was about 98%. The overall operating time was only 16 hours, and the Ba product met the desired purity requirements.

EXAMPLE 10

This example is an actual large scale production run, intended to show the dissolution of the metathesis cake by HNO₃ and sodium acetate and the use of EDTA only for the dissolution of unmetathesized Ba—PbSO₄. Except as indicated, this example is otherwise the same as Example 9.

The metathesis cake was dissolved in 10 liters of a solution 0.1 M in HNO₃ and 0.5 M in sodium acetate and the resulting solution was passed through a Dowex-50, Na⁺ form resin ion exchange column, 60–100 mesh, 4 inches diameter x 19 inches length, at a flow rate of 8 ml./min./cm.² The remaining undissolved metathesis cake was then dissolved in 16 liters of 0.0625 M EDTA and the resulting solution adjusted to pH 6.3. The column was washed with 2.0 liters of water and the effluent waste (12.0 l) contained 0% Ba, 0% Sr and 2.8% Ce. Before the passage of the EDTA solution through the column the Pb was first selectively eluted with 17.0 liters of 1.5 M NaOH and the column washed with 10.0 liters of water. The Pb waste solution additionally contained 0% Ba, approximately 19% Sr and 12% Ce and totalled 27 liters.

The EDTA feed solution was then passed through the column at a rate of approximately 7 ml./min./cm.², and the column washed with 7.5 liters of water to remove any traces of feed solution. The effluent totalled 18.0 liters and contained only 1.2% Ba, approximately 80% Sr, and 37.8% Ce. The Sr removal was then completed with the passage of 3.4 liters of pH 6.3, 0.07 M EDTA through the column, followed by 7.5 liters of wash water. The effluent contained 0.9% Ba, approximately 0.1% Sr and 7.6% Ce.

At this point, substantially only Ba and Na remained on the column, and the Na was eluted with 15 liters of 1.0 M HCl, after which the column was washed with 4.0 liters of water. The Na effluent additionally contained 0.7% Ba, 0.4% Sr and 1.0% Ce and totalled 19 liters. The Ba product, the last remaining cation on the resin, was eluted with 17.0 liters of 9M HNO₃.

The product eluate was then further purified by the following procedure. The eluate, which contained 97% of the original Ba, 0.8% Sr, 38.8% Ce, 17.0 mg. Pb, 1.5 grams Na and 0.25 gram of Fe, Ni and Cr, was evaporated to a volume of 6.0 liters. Barium was precipitated from the solution with 7.0 liters of 91% nitric acid and the resulting Ba(NO₃)₂ precipitate separated from the resulting supernatant solution. The supernatant solution contained 1.2% Ba, 0.1% Sr, 37.2% Ce, 16.2% mg. Pb, 1.36 grams Na, and 230 milligrams of Fe, Ni and Cr. The Ba(NO₃)₂ precipitate was dissolved in 0.35 liter of hot water and analyzed. The analysis showed that a 95.8% recovery of barium was achieved, and the product contained only 0.7% Sr, 1.6% Ce, 1.1 mg. Pb, 0.14 gram Na, and 10 mg. each of Fe, Ni and Cr, which was well within the plant-established purity specifications for this product. The overall process time was only about four hours.

Although my invention is described with particular emphasis upon its important application to the recovery of barium from uranium and nuclear fission products, it is inherently of much wider applicability. My method is also well adapted to the separation of closely related, difficulty-separable metals, many of whose salts are generally insoluble. For instance, my invention may be valuably applied, with little significant modification, to the recovery of radium, another alkaline earth metal, from barium and thereby replace the present tedious and time-consuming fractional crystallization methods. Radium and barium sulfates or carbonates may be dissolved with EDTA and contacted with the resin. As in my separation of the alkaline earth metals strontium and barium, where the lighter strontium is removed first from the resin, so with barium and radium, the lighter barium will be first removed. It is therefore understood that all matters contained in the above description and examples are illustrative only and do not limit the scope of my present invention.

Having thus described my invention, I claim the following:

1. A method for the separation of barium values from an aqueous nitric acid solution of neutron-irradiated uranium contaminated with fission products, including strontium values, which comprises providing a sufficient quantity of sulfate ions and lead ions in said solution to precipitate barium from said solution as the sulfate together with lead, separating the resulting barium-lead-strontium-containing sulfate precipitate from the resulting supernatant solution, dissolving the separated precipitate in an aqueous solution of ethylene diamine tetra acetic acid, adjusting the resulting solution to pH 6.0–6.5, contacting the resulting solution with a comminuted organic cation exchange resin bed characterized by a plurality of methylene sulfonic acid groups and initially in the sodium form, whereby strontium and barium values are adsorbed on said bed, selectively eluting the resulting adsorbed strontium values from said bed with 0.05 to 0.2 molar aqueous ethylene diamine tetra acetic acid at pH 6.0–6.5, eluting sodium values with 0.5 to 2.0 molar aqueous hydrochloric acid and finally eluting the barium product with 6 to 12 molar aqueous nitric acid.

2. A method for the separation of barium values from an aqueous nitric acid solution of neutron-irradiated uranium contaminated with fission products, including strontium values, which comprises providing a sufficient quantity of sulfate ions and lead ions in said solution to precipitate barium from said solution as the sulfate together with lead, separating the resulting barium-lead-strontium-containing precipitate from the resulting supernatant solution, contacting the separated sulfate precipitate with an alkali carbonate, dissolving the resulting carbonate precipitate in an aqueous solution of nitric acid and sodium acetate, separately dissolving any undissolved precipitate in an aqueous ethylene diamine tetra acetic acid solution and adjusting the resulting diamine solution to pH 6.0–6.5, separately contacting the resulting nitric acid-sodium acetate solution with a comminuted organic cation exchange resin bed characterized by a plurality of methylene sulfonic acid groups and initially in the sodium form, whereby lead, strontium, and barium values are adsorbed on said bed, eluting the resulting adsorbed lead values from said resin bed with aqueous alkali hydroxide, and then contacting the diamine solution with the lead-depleted resin bed, eluting adsorbed strontium values from said bed with 0.05 to 0.2 molar aqueous sodium ethylene diamine tetra acetate at pH 6.0–6.5, eluting sodium values with 0.5 to 2.0 molar aqueous hydrochloric acid, and finally eluting the adsorbed barium product with 6 to 12 molar aqueous nitric acid.

3. A method for the recovery of barium values from an aqueous nitric acid solution of neutron-irradiated uranium contaminated with fission products, including strontium values, which comprises providing a sufficient quantity of sulfate ions and lead ions in said solution to precipitate said barium as the sulfate together with lead, separating the resulting barium-lead-strontium-containing sulfate precipitate from the resulting supernatant solution, contacting the separated sulfate precipitate with an alkali carbonate, dissolving the resulting carbonate precipitate in an aqueous solution of nitric acid and ethylene diamine tetra acetic acid, adjusting the resulting diamine solution to pH 6.0–6.5, contacting the pH-adjusted solution wtih a comminuted organic cation exchange resin characterized by a plurality of methylene sulfonic acid groups and initially in the sodium form, whereby strontium and barium values are adsorbed on said resin, selectively eluting and collecting the resulting adsorbed strontium values with a 0.05 to 0.2 molar aqueous solution of sodium ethylene diamine tetra acetate at pH 6.0–6.5, eluting sodium values with 0.5 to 2.0 molar aqueous hydrochloric acid, and finally eluting the barium product with 6 to 12 molar aqueous nitric acid.

4. A method for the separation of barium values from an aqueous nitric acid solution of neutron irradiated uranium contaminated with fission products, including strontium values, which comprises adding approximately 1 gram lead nitrate per liter to said solution followed by sulfuric acid, until a sulfuric acid concentration of approximately 3.6 molar is obtained, digesting the resulting solution at approximately 90° C. for approximately one hour, separating the resulting barium-lead-strontium-containing sulfate precipitate from the resulting supernatant solution, digesting the separated sulfate precipitate with approximately 0.5 molar potassium carbonate for approximately one hour, separating the carbonate precipitate from the supernatant solution, dissolving the separated carbonate precipitate in an aqueous solution approximately 0.5 molar in nitric acid and approximately 0.05 molar in ethylene diamine tetra acetic acid, adjusting the resulting diamine solution to approximately pH 6.3, passing the pH-adjusted solution through a comminuted organic cation exchange resin characterized by a plurality of methylene sulfonic acid groups and originally in the sodium form at a flow rate of approximately 4–12 ml./cm.$^2$/min. whereby strontium and barium values are adsorbed on said bed and, selectively eluting the resulting adsorbed strontium values from said resin with approximately 0.07 molar sodium ethylene diamine tetra acetate at pH 6.3, eluting the sodium values with 1.0 molar hydrochloric acid and finally eluting the barium product with approximately 9 molar nitric acid, all at a flow rate of approximately 4–12 ml./cm.$^2$/min.

5. A method for the separation of barium values from an aqueous uranyl solution of neutron-irradiated uranium, which comprises providing a sufficient quantity of sulfate ions and lead ions in said solution to precipitate barium in said solution as the sulfate together with lead, separating the resulting barium-lead-containing precipitate from the resulting supernatant solution, contacting said separated precipitate with an alkali carbonate dissolving the resulting barium-lead carbonate in an aqueous solution of nitric acid and an aliphatic diamine chelating reagent having the two amine groups linked by an aliphatic chain containing from 2–5 carbon atoms, adjusting the resulting solution to pH 6.0–6.5, contacting the resulting diamine solution with a bed of comminuted cation exchange resin whereby barium values are adsorbed on said bed and eluting the adsorbed barium values from said bed with 6 to 12 molar nitric acid.

6. A method for the separation of barium values from an aqueous uranyl solution of neutron-irradiated uranium, which comprises providing a sufficient quantity of sulfate ions and lead ions in said solution to precipitate barium in said solution as the sulfate together with lead, separating the resulting barium-lead-containing precipitate from the resulting supernatant solution, contacting said separated precipitate with an alkali carbonate, dissolving the resulting carbonate precipitate in an aqueous solution of nitric acid and carboxylate ions, selected from the group consisting of acetate and propionate separately dissolving any undissolved precipitate in an aqueous solution of ethylene diamine tetra acetic acid and adjusting the resulting solution to pH 6.0–6.5, separately contacting the resulting nitric acid-carboxylate solution with a bed of a comminuted cation exchange resin, whereby lead and barium values are adsorbed on said resin, eluting the resulting adsorbed lead values from said resin bed with approximately 0.5 molar alkali metal hydroxide, and then contacting thed iamine solution with the lead-depleted resin bed, and eluting and collecting the adsorbed barium values from said bed with 6–12 molar aqueous nitric acid.

References Cited in the file of this patent

Coryell et al.: Radiochemical Studies: The Fission Products, Book 3, pages 1482–1844 (1951). Published by McGraw-Hill, New York.

Rodden: Analytical Chemistry of the Manhattan Project, pages 694–697 (1950). Published by McGraw-Hill, N.Y.